(12) United States Patent
Shriwas et al.

(10) Patent No.: US 12,184,506 B2
(45) Date of Patent: Dec. 31, 2024

(54) DYNAMIC CREATION OF SCHEMA FRAMEWORK FOR INVENTORY MANAGEMENT

(71) Applicant: RAKUTEN MOBILE, INC., Tokyo (JP)

(72) Inventors: Pawan Shriwas, Indore (IN); Apurva Tripathi, Indore (IN); Shivangi Bagdare, Indore (IN); Pankaj Pachori, Indore (IN); Ayush Kumar Singh, Indore (IN); Rashmi Soni, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/910,488

(22) PCT Filed: Jun. 23, 2022

(86) PCT No.: PCT/US2022/034635
§ 371 (c)(1),
(2) Date: Sep. 9, 2022

(87) PCT Pub. No.: WO2023/249628
PCT Pub. Date: Dec. 28, 2023

(65) Prior Publication Data
US 2024/0205099 A1  Jun. 20, 2024

(51) Int. Cl.
*G06F 13/00* (2006.01)
*H04L 41/0866* (2022.01)
(Continued)

(52) U.S. Cl.
CPC ........ *H04L 41/145* (2013.01); *H04L 41/0866* (2013.01); *H04L 41/40* (2022.05)

(58) Field of Classification Search
CPC .... H04L 41/145; H04L 41/0866; H04L 41/40
(Continued)

(56) References Cited

U.S. PATENT DOCUMENTS 8,768,654 B2 * 7/2014 Srinivasan ............. G06Q 10/00
707/791
11,818,092 B2 * 11/2023 Kumar ................ H04L 61/5007
(Continued)

OTHER PUBLICATIONS

International Search report dated Oct. 31, 2022 from the International Searching Authority in International Application No. PCT/US2022/034635.
(Continued)

*Primary Examiner* — Kenneth R Coulter
(74) *Attorney, Agent, or Firm* — Sughrue Mion, PLLC (57) ABSTRACT

This disclosure provides methods, apparatuses, and computer-readable mediums for managing network devices in a telecommunication network using dynamically modifiable graph data schema. The method may be executed by one or more processors and may include creating an entity model specification file; validating a syntax of the entity model specification file based on parsing the entity model specification file; based on the syntax being valid, validating the entity model specification file, wherein validating the entity model specification file comprises converting the entity model specification file into a graph data schema; and initiating the graph data schema associated with the entity model specification file, wherein the initiating comprises changing the graph data schema to a ready state.

20 Claims, 5 Drawing Sheets

(51) Int. Cl.
*H04L 41/14* (2022.01)
*H04L 41/40* (2022.01)

(58) Field of Classification Search
USPC .......................................... 709/223, 220–222
See application file for complete search history.

(56) References Cited

U.S. PATENT DOCUMENTS

2004/0073647 A1* 4/2004 Gentile ................ H04Q 3/0087
455/422.1
2012/0278046 A1* 11/2012 Srinivasan ........... G06Q 10/067
703/1

OTHER PUBLICATIONS

Written Opinion dated Oct. 31, 2022 from the International Searching Authority in International Application No. PCT/US2022/034635.

* cited by examiner

DYNAMIC CREATION OF SCHEMA FRAMEWORK FOR INVENTORY MANAGEMENT

This application is a National Stage of International Application No. PCT/US2022/034635 filed Jun. 23, 2022.

TECHNICAL FIELD

Embodiments of the present disclosure relate to methods and systems for dynamic schema framework. More particularly embodiments of the present disclosure relate to methods and systems for dynamic schema framework using data modelling.

BACKGROUND

Mobile network operators invest significant resources in maintaining a central repository comprising data schemas and information associated with network devices, cell sites, RANs, etc., in the telecommunication network. Network operators may utilize the central repository to gather data about the network devices in the telecommunication network, assess network performance, and analyze improvements that may be needed. Central repositories may include a combination of different repositories in different data schemas. Traditional repository management tools require extensive efforts for integrating the different repositories, e.g., additional coding, testing, and deployment. Not only does this require manual and technical resources, it is also a time consuming process. Additionally, it may also result in the telecommunication network or at least some sections of the telecommunication network being offline or unavailable.

Therefore, dynamic methods of managing network devices in the telecommunication network and/or integrating network devices in the centralized repository are needed.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for visualization of coverage area deficiencies are provided.

According to an aspect of the present disclosure, a method for managing network devices in a telecommunication network using dynamically modifiable graph data schema (also referred to hereinbelow as a dynamically modifiable graphic data schema or a graph schema). The method may be executed by one or more processors and may include creating an entity model specification file; validating a syntax of the entity model specification file based on parsing the entity model specification file; based on the syntax being valid, validating the entity model specification file, wherein validating the entity model specification file comprises converting the entity model specification file into a graph data schema; and initiating the graph data schema associated with the entity model specification file, wherein the initiating comprises changing the graph data schema to a ready state.

According to an aspect of the present disclosure, an apparatus for managing network devices in a telecommunication network using dynamically modifiable graphic data schema may be provided. The apparatus may include a memory storing instructions; and at least one processor configured to execute the instructions. The instructions may be to create an entity model specification file; validate a syntax of the entity model specification file based on parsing the entity model specification file; based on the syntax being valid, validate the entity model specification file, wherein validating the entity model specification file comprises converting the entity model specification file into a graph data schema; and initiate the graph data schema associated with the entity model specification file, wherein the initiating comprises changing the graph data schema to a ready state.

According to an aspect of the present disclosure, a non-transitory computer-readable recording medium having recorded thereon instructions executable by at least one processor to perform a method for managing network devices in a telecommunication network using dynamically modifiable graphic data schema may be provided. The method may include creating an entity model specification file; validating a syntax of the entity model specification file based on parsing the entity model specification file; based on the syntax being valid, validating the entity model specification file, wherein validating the entity model specification file comprises converting the entity model specification file into a graph data schema; and initiating the graph data schema associated with the entity model specification file, wherein the initiating comprises changing the graph data schema to a ready state.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Mobile network operators invest significant resources in maintaining a central repository comprising data schemas and information associated with network devices, cell sites, RANs, etc., in the telecommunication network. Network operators may utilize the central repository to gather data about the network devices in the telecommunication network, assess network performance, and analyze improvements that may be needed. Central repositories may include a combination of different repositories in different data schemas. Traditional repository management tools require extensive efforts for integrating the different repositories, e.g., additional coding, testing, and deployment. Not only does this require manual and technical resources, it is also a time consuming process. Additionally, it may also result in the telecommunication network or at least some sections of the telecommunication network being offline or unavailable. Therefore, dynamic methods of managing network devices in the telecommunication network and/or integrating network devices in the centralized repository are needed.

According to embodiments of the present disclosure, a dynamic schema framework may be provided to dynamically create and enhance a data model on the fly to manage the central repository without changing any code logic on the backend. According to embodiments, interface design and implementation may include a method, system, and/or program code to create and upload a new or revised data model (e.g., graph data model) without additional coding, testing, and deployment and without the telecommunication system being offline for any length of time. Embodiments of the present disclosure enable adding, creating, and uploading data schemas associated with new entities or modify data schemas associated with entities already existing in the central repository.

Embodiments of the present disclosure may enable network operators or system admins to create, upload, or modify data schemas or data models easily using a simplified user interface. The simplified user interface may automatically trigger the network operator or system admin requested changes and/or additions to the data schemas, or data models using application programming interfaces (APIs). Additionally, in some embodiments, the network operator and/or system admin may also create indexes and database constraints enabling overall and simplified schema management on the fly or in real time.

Embodiments of the present disclosure provide a number of technical benefits. As an example, enabling on the fly schema management to integrate network devices in a telecommunication network's centralized repository circumvents the need to individually code, test, and deploy data schemas for integration or even modification of existing data schemas. This enables fast application of changes to the central repository of the telecommunication system improving the overall computing capacity of the telecommunication network and reducing times that the telecommunication network may need to be offline. Thus, embodiments of the present disclosure enable improved computing within the telecommunication network, improve the online time of the telecommunication network, improve the efficiency of resource usage by the telecommunication network, and enable better access and analysis of data associated with the network devices of the telecommunication network.

Figure 1:
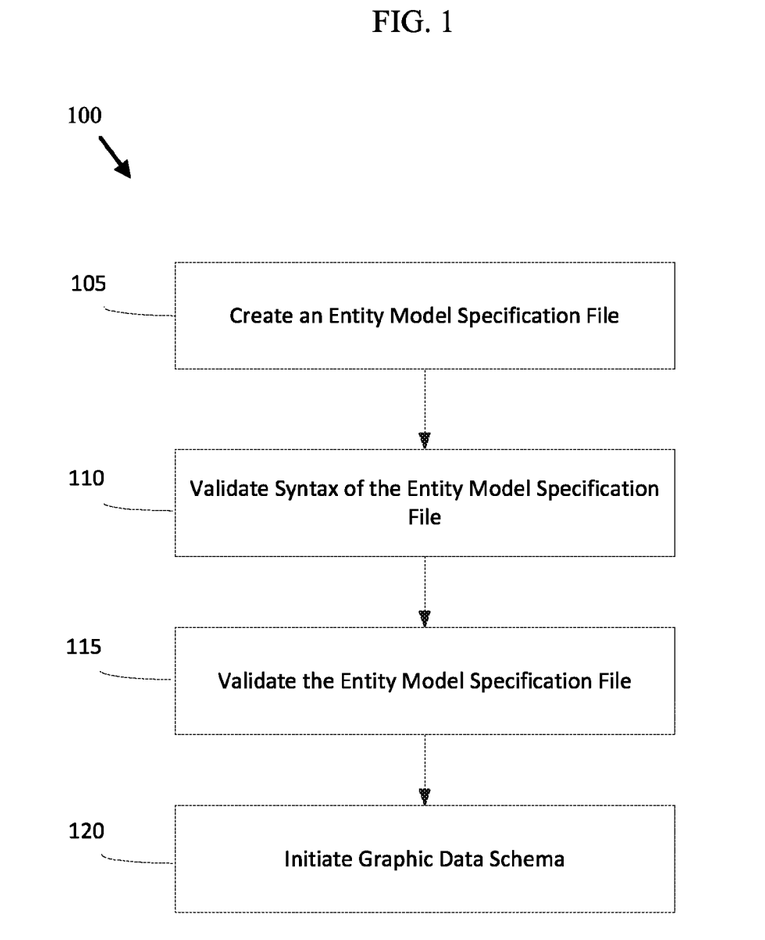
FIG. 1 is an example flowchart for creating and/or activating a data schema for managing network devices in a telecommunication network, according to an embodiment of the present disclosure.

FIG. 1 is a flowchart illustrating an example process 100 for creating and/or activating a data schema for managing network devices in a telecommunication network, according to an embodiment of the present disclosure.

According to embodiments, a data modelling methodologies (e.g., data modelling languages such as Yet Another Next Generation (YANG)) may be used for data schema creation, manage state data, schema modification, and other administrative actions associated with network entities using one or more networking protocols. In some embodiments, the data modelling language, e.g., YANG, may be modified or extended to add a number attributes that are needed to capture some additional information that is not supported by default.

At operation 105, a data schema associated with a network entity may be created based on an entity model specification (e.g., a file or any known data structure). The entity model specification file may include data schema details for different sections of any entity for that model type. In some embodiments, the entity model specification file may include a module name, version information, or superclass information. These may be converted to parent attributes. The entity model specification file may include information associated with one or more classes within the entity model. In some embodiments, the entity model specification file may include attributes for the one or more classes, which may be converted into entity characteristics. In some embodiments, the entity model specification file may include relationships for the one or more classes, which may be converted into entity relationships. In some embodiments, the entity model specification file may include indices for the one or more classes, which may be converted into entity indexes. In some embodiments, the entity model specification file may include constraints for the one or more classes, which may be converted into entity constraints. The entity model specification file may be created by a user, network operator, or a system admin using a simplified user interface including one or more APIs.

At operation 110, the syntax of the entity model specification file may be validated based on a parsing the entity model specification file. The validating of the syntax of the entity model specification file may include parsing the entity model specification file. Validating the syntax may include determining that a minimal amount of information related to the entity or as required by a base model is present in the entity specification file. In some embodiments, validating the syntax may include determining that there are no missing mandatory attributes or characteristics. As an example, validating the syntax may include whether mandatory attributes indicating a source of the entity, a version, a base model type, or a relation to a base model are present. Based on determining that the syntax of the entity model specification file is invalid, an error message may be generated. The error message may be displayed on the simplified user interface.

At operation 115, the entity model specification file may be validated based on the syntax of the entity model specification file, wherein validating the entity model specification file may include converting the entity model specification into a graph metadata schema.

The validating of the entity model specification file may include determining whether a base model associated with the entity model specification file is supported. The version included in the entity model specification file may be validated. The name and the name and each of the one or more operator specific characteristics may be retrieved and their uniqueness may be verified. Subsequently, based on determining that the name and each of the one or more operator specific characteristics are unique, one or more relationships included in the entity model specification file may be validated. The validating of the entity model specification file may include generating a wrapper for the entity model specification based on a specific format, the specific format may be based on a database to store the entity model specification. Graph data schema may be generated in the database based on the wrapper, wherein the generating may include adding one or more nodes and one or more edges in the based on the wrapper.

According to an embodiment, the validating of the entity model specification file may include generating a list of map instructions based on the one or more relationships and the one or more operator specific characteristics. A graph data schema may be generated in a database based on the list of map instructions.

In some embodiments, validating the one or more relationships may include determining whether an association between the network device and a subsection of the telecommunication network in each of the one or more relationships is proper. Determining whether the association is proper may include determining that a respective relationship from the one or more relationships represents an accurate parent child relationship between the network device and the subsection of the telecommunication network.

Based on determining that the entity model specification file is invalid, an error message may be generated. The error message may be displayed on the simplified user interface.

At operation 120, the graph data schema associated with the entity model specification file may be initiated, wherein the initiating may include changing the graph data schema to a ready state. The ready state may include making the graph data schema available to the user.

Figure 2:
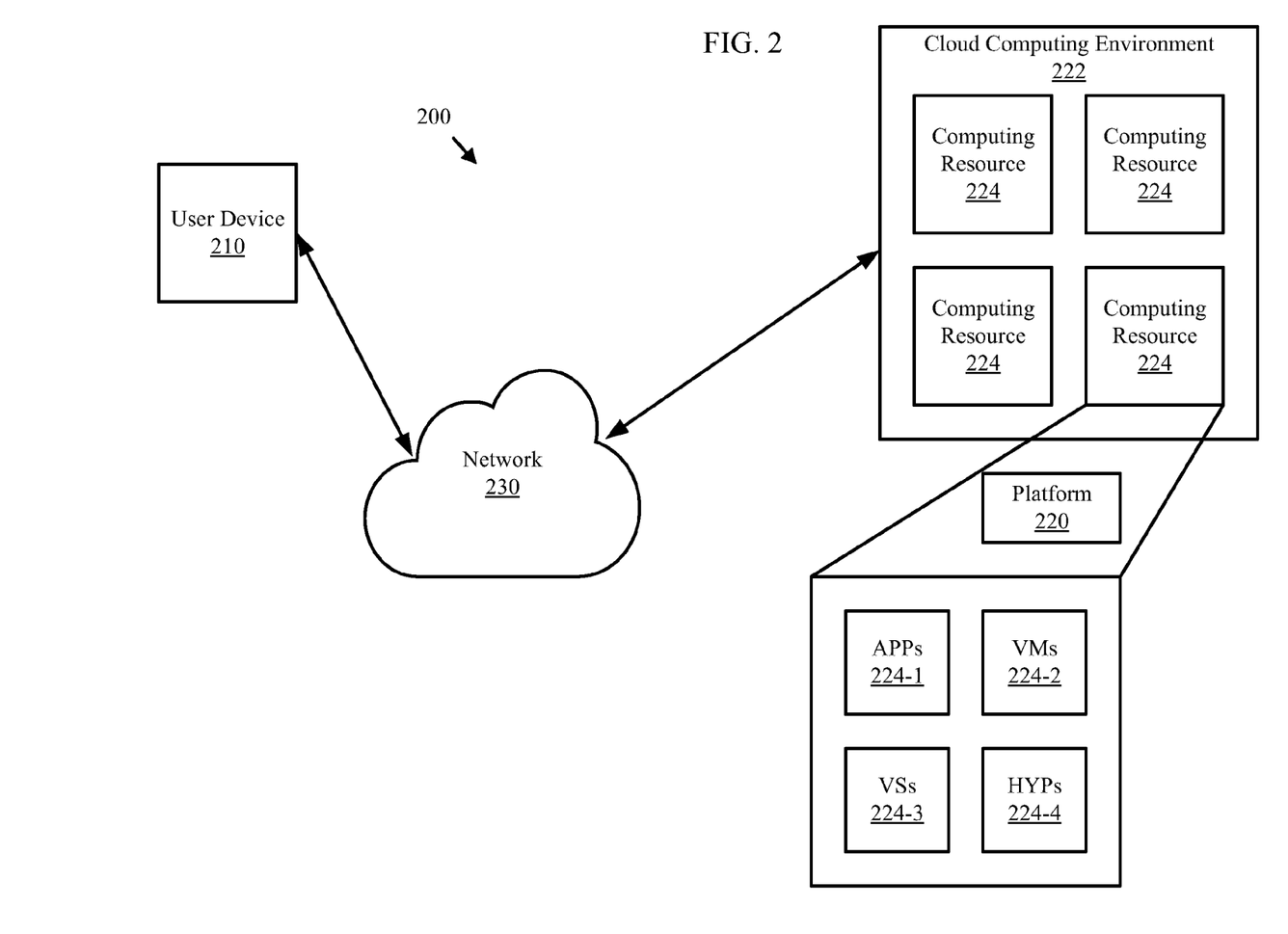
FIG. 2 is a diagram of an example environment in which systems and/or methods, described herein, may be implemented, according to embodiments.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above may be performed by any combination of elements illustrated in FIG. 2.

User device 210 includes one or more devices capable of receiving, generating, storing, processing, and/or providing information associated with the centralized repository or platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2 computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
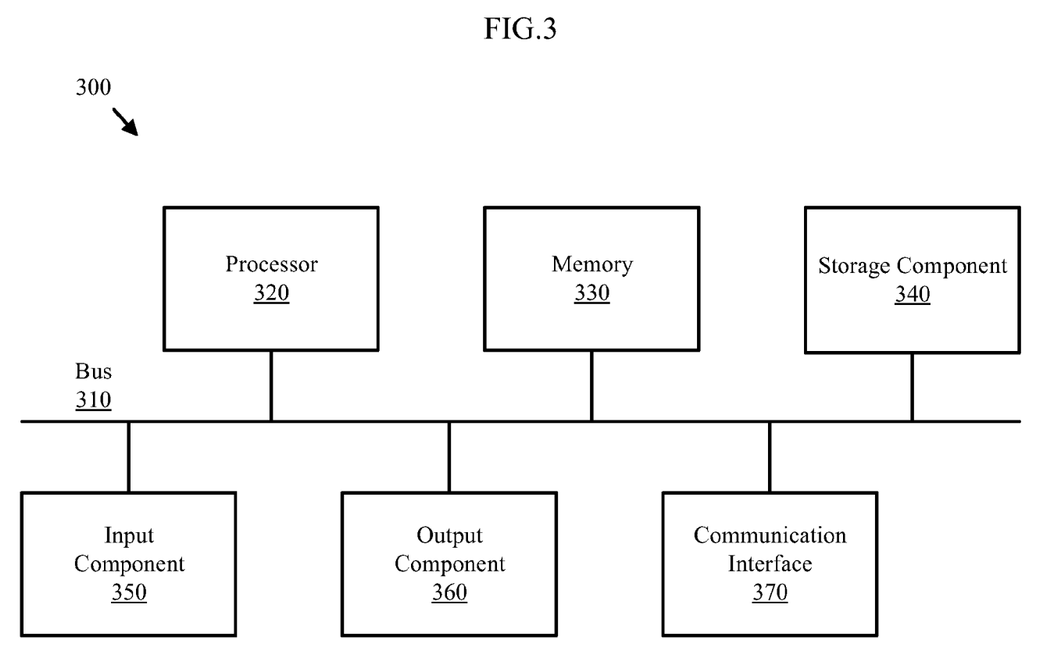
FIG. 3 is a diagram of example components of one or more devices of FIG. 2, according to embodiments.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
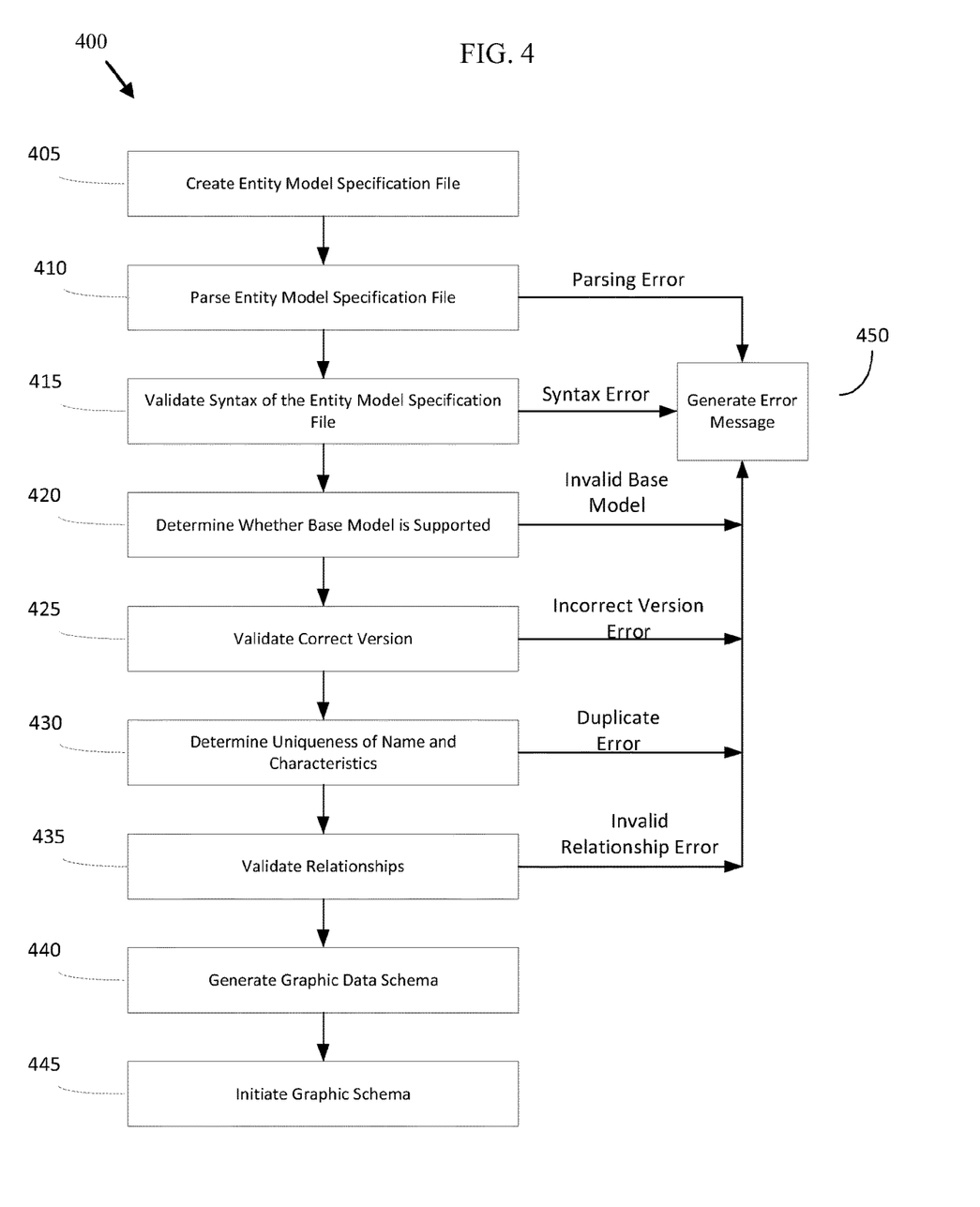
FIG. 4 an example flowchart for creating and/or activating a data schema for managing network devices in a telecommunication network, according to an embodiment of the present disclosure.
Figure 5:
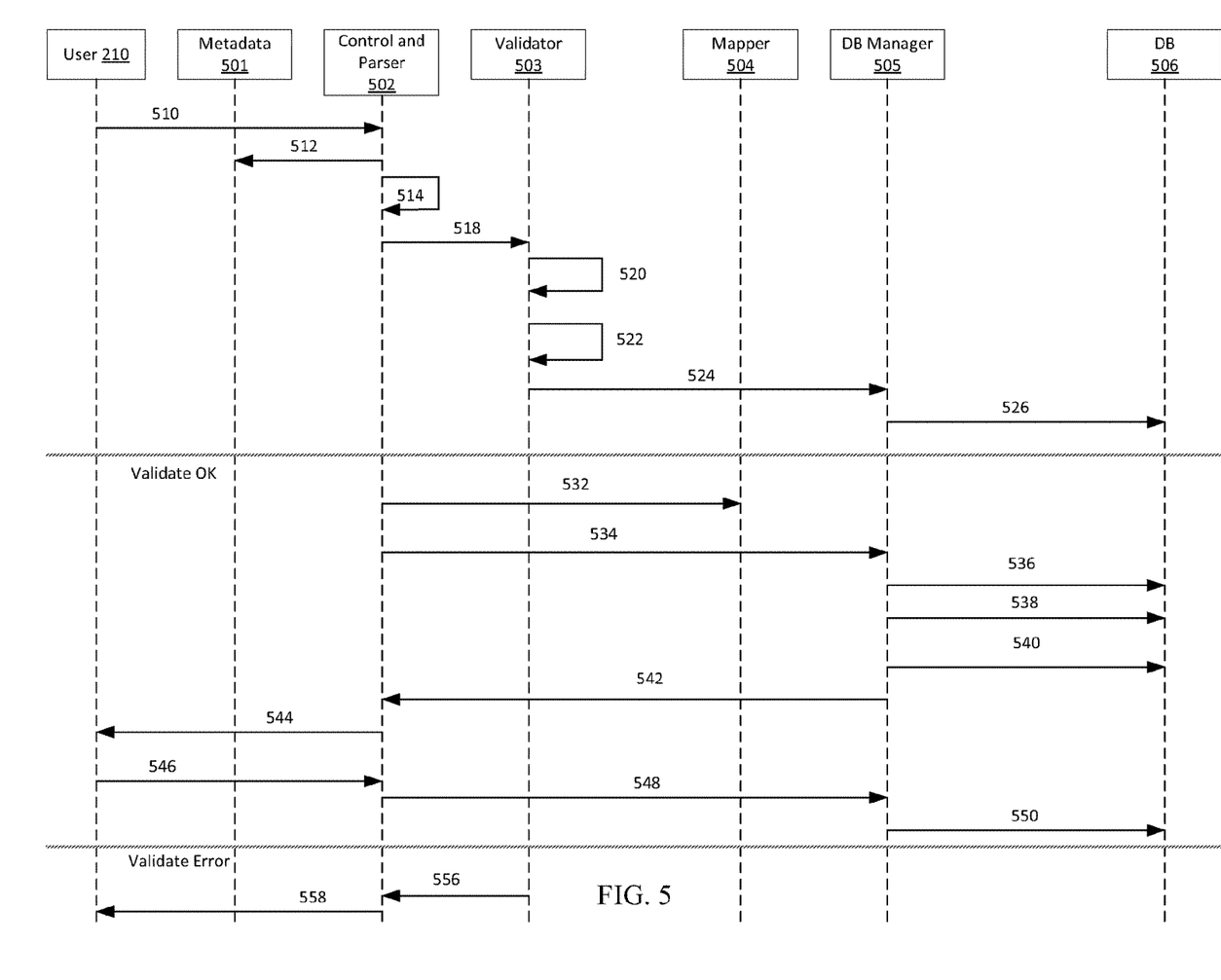
FIG. 5 an example workflow diagram, for creating and/or activating a data schema for managing network devices in a telecommunication network, according to an embodiment of the present disclosure.

In embodiments, any one of the operations or processes of FIG. 1, 4, or 5 may be implemented by or using any one of the elements illustrated in FIGS. 2 and 3.

FIG. 4 is a flowchart for an exemplary process 400 for creating and/or activating a data schema for managing network devices in a telecommunication network, according to an embodiment of the present disclosure.

At operation 405, an entity model specification file may be created. The entity model specification file may include data schema details for different sections of any entity for that model type. In some embodiments, the entity model specification file may include a module name, version information, or superclass information. These may be converted to parent attributes. The entity model specification file may include information associated with one or more classes within the entity model. In some embodiments, the entity model specification file may include attributes for the one or more classes, which may be converted into entity characteristics. In some embodiments, the entity model specification file may include relationships for the one or more classes, which may be converted into entity relationships. In some embodiments, the entity model specification file may include indices for the one or more classes, which may be converted into entity indexes. In some embodiments, the entity model specification file may include constraints for the one or more classes, which may be converted into entity constraints. The entity model specification file may be created by a user, network operator, or a system admin using a simplified user interface including one or more APIs.

At operation 410, the entity model specification may be parsed. In some embodiments, a graphic data model parser (e.g., a YANG parser) may parse the entity model specification file to extract model information and validate that the entity specification file has sufficient information to generate, initiate, and/or activate graphic data models based on the entity model specification file.

At operation 415, the syntax of the entity model specification may be validated. The validating of the syntax of the entity model specification file may include parsing the entity model specification file. Validating the syntax may include determining that a minimal amount of information related to the entity or as required by a base model is present in the entity specification file. In some embodiments, validating the syntax may include determining that there are no missing mandatory attributes or characteristics. As an example, validating the syntax may include whether mandatory attributes indicating a source of the entity, a version, a base model type, or a relation to a base model are present. Based on determining that the syntax of the entity model specification file is invalid, an error message may be generated. The error message may be displayed on the simplified user interface.

At operation 420, whether a base model is supported by the entity specification file may be determined. In some embodiments, once the syntax of the entity model specification file is determined as being valid, a determination is made as to whether a bae model is supported by the details in the entity model specification file. As an example, a base model may be predetermined by the network operators and/or the user and may include attributes that must be present for a successful representation of that entity in graphic data schema. A base model may include a combination of a module name, version information, or superclass information. In some embodiments, the base model may also include one or more constraints and one or more entity relationships.

At operation 425, a correct version of the entity model specification may be validated. In some embodiments, a correct version of a particular model type being described in the entity model specification file may be determined. Ensuring that the correct model versions are included in the entity model specification file enables accurate and efficient management of the network devices.

At operation 430, a uniqueness of the name and characteristics, based on the entity model specification file may be determined. Determining whether the name and each of the one or more operator specific characteristics are unique ensures integrity and uniqueness when managing the network devices in the telecommunication network. At operation 435, one or more relationships in the entity model specification may be validated. As an example, based on determining that the name and each of the one or more operator specific characteristics are unique, one or more relationships may be validated. In some embodiments, subsequent to one or more validation operations, a wrapper for the entity model specification may be generated based on a specific format, the specific format being based on a database to store the entity model specification.

At operation 440, graphic data schema may be generated based on the entity specification model. In some embodiments, generating the graphic data schema in the database may be based on the wrapper. Generating the graphic data schema may include adding one or more nodes and one or more edges in the based on the wrapper and the validated entity model specification.

At operation 445, the generated graphic data schema may be initiated. Initiation of the generated graphic data schema may include ingestion into the database, the vertex and their links (e.g., nodes) and mark the model specification as "ready" state. The "ready" state being the model definition being loaded into the system as metadata and the model being ready to be applied.

At operation 450, an error message may be generated. The error message may be generated. During any of the operations 410-435, if the validation fails or if an unexpected interaction takes place, an appropriate error message indicating any identified or potential error may be generated and the process 400 terminated, with no graphic data schema being generated and/or initiated.

FIG. 5 illustrates an exemplary workflow 500 for creating and/or activating a graphic data schema for managing network devices in a telecommunication network, according to an embodiment of the present disclosure.

At operation 510, the user 210, who may be a network operator, moderator, or any authorized user, may create the entity model specification file and transmit it, in some embodiments via a simplified user interface, to the control and parser 502. At operation 512, the control and parser 502 may request or load metadata associated with the entity model specification file from a metadata store 501. At operation 514, the parser may normalize the parsed entity model specification file. Any known technique of normalizing data and/or databases may be used.

At operation 518, the control and parser 502 may transmit the normalized and/or parsed entity model specification file to a validator 503. In some embodiments, when the control and parser 502 transmits the normalized and/or parsed entity model specification file, it may also transmit a request for specific validation. At operation 520, the validator 503 may validate the syntax of the entity model specification file. At operation 522, the validator 503 may validate the entity model specification file. The validator 503 may perform semantic validations of the relationships, names, and characteristics included in the entity model specification file. In some embodiments, as a part of validation, the validator 503, at operation 524, may perform some verification, such as correct version inclusion, unique name, base model existence, proper relationships, etc., by requesting information from a database manager 505. In some embodiments, the validator may request information from a database 506.

Operations performed while validating may include the following. At operation 532, based on the entity model specification file, one or more nodes and one or more edges and their relationships may be mapped by a mapper 504. In some embodiments, at operation 532, a list of operations to generate and/or map the characteristics and relationships based on the entity model specification file may be created and the list may be stored in a database, e.g., database 506.

At operation 534, new classes and relationships may be created and mapped based on the list of instructions created in operation 532. As an example, at operations 536-538, one or more nodes and one or more edges may be added to generate a graphic data model based on the entity model specification. At operation 540, metadata may be normalized. At operation 542, once the new classes and relationships are ready, an indication may be sent to the control and parser 502. At operation 544, once the new classes and relationships are ready, an indication may be sent to the user 210. At operations 546-550, the generated graphic data schema may be initiated. Initiation of the generated graphic data schema may include ingestion into the database 506 and/or database manager 505, the vertex and their links (e.g., nodes) and mark the model specification as "ready" state. The "ready" state being the model definition being loaded into the system as metadata and the model being ready to be applied.

At operations 556-558, an error message may be generated by the validator 503 and transmitted to the control and parser or the user 210 respectfully. The error message may be generated if the validation fails or if an unexpected interaction takes place.

Thus, according to embodiments of the present disclosure, a graphic data schema may be created for on the fly management of network devices in the telecommunication network without significant downtime of the telecommunication network.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for managing network devices in a telecommunication network using a graph data schema, the method executed by one or more processors, the method comprising:
    creating an entity model specification file;
    validating a syntax of the entity model specification file based on parsing the entity model specification file;
    based on the syntax being valid, validating the entity model specification file, wherein validating the entity model specification file comprises converting the entity model specification file into the graph data schema; and
    initiating the graph data schema associated with the entity model specification file, wherein the initiating comprises changing the graph data schema to a ready state.

2. The method of claim 1, wherein the entity model specification file includes a name, a network device type, a version, one or more operator specific characteristics, and one or more relationships.

3. The method of claim 2, wherein the validating the entity model specification file comprises:
    determining whether a base model associated with the entity model specification file is supported;
    validating the version in the entity model specification file;
    determining whether the name and each of the one or more operator specific characteristics are unique; and based on determining that the name and each of the one or more operator specific characteristics are unique, validating the one or more relationships.

4. The method of claim 3, wherein the validating the entity model specification file further comprises:
generating a wrapper for the entity model specification file based on a specific format, the specific format being based on a database to store the entity model specification file; and
generating the graph data schema in the database based on the wrapper, wherein the generating includes adding one or more nodes and one or more edges in the based on the entity model specification file.

5. The method of claim 3, wherein the validating the entity model specification file further comprises:
generating a list of map instructions based on the one or more relationships and the one or more operator specific characteristics; and
generating the graph data schema in a database based on the list of map instructions.

6. The method of claim 3, wherein validating the one or more relationships comprises determining whether an association between a network device and a subsection of the telecommunication network in each of the one or more relationships is proper.

7. The method of claim 6, wherein determining whether the association is proper comprises determining that a respective relationship from the one or more relationships represents an accurate parent child relationship between the network device and the subsection of the telecommunication network.

8. The method of claim 1, further comprising generating an error message based on determining that the syntax is invalid.

9. The method of claim 1, further comprising generating an error message based on determining that the entity model specification file is invalid.

10. The method of claim 1, wherein the entity model specification file further comprises indexes and plurality of constraints.

11. An apparatus for managing network devices in a telecommunication network using a graph data schema, the apparatus comprising:
a memory storing instructions; and
at least one processor configured to execute the instructions to:
create an entity model specification file;
validate a syntax of the entity model specification file based on parsing the entity model specification file;
based on the syntax being valid, validate the entity model specification file, wherein validating the entity model specification file comprises converting the entity model specification file into the graph data schema; and
initiate the graph data schema associated with the entity model specification file, wherein the initiating comprises changing the graph data schema to a ready state.

12. The apparatus of claim 11, wherein the entity model specification file includes a name, a network device type, a version, one or more operator specific characteristics, and one or more relationships.

13. The apparatus of claim 12, validating the entity model specification file comprises the at least one processor being further configured to execute the instructions to:
determine whether a base model associated with the entity model specification file is supported;
validate the version in the entity model specification file;
determine whether the name and each of the one or more operator specific characteristics are unique; and
based on determining that the name and each of the one or more operator specific characteristics are unique, validate the one or more relationships.

14. The apparatus of claim 13, wherein validating the entity model specification file further comprises the at least one processor being further configured to execute the instructions to:
generate a wrapper for the entity model specification file based on a specific format, the specific format being based on a database to store the entity model specification file; and
generate the graph data schema in the database based on the wrapper, wherein the generating includes adding one or more nodes and one or more edges in the based on the entity model specification file.

15. The apparatus of claim 13, wherein validating the entity model specification file further comprises the at least one processor being further configured to execute the instructions to:
generate a list of map instructions based on the one or more relationships and the one or more operator specific characteristics; and
generate the graph data schema in a database based on the list of map instructions.

16. The apparatus of claim 13, wherein validating the one or more relationships comprises determining whether an association between a network device and a subsection of the telecommunication network in each of the one or more relationships is proper.

17. The apparatus of claim 16, wherein determining whether the association is proper comprises determining that a respective relationship from the one or more relationships represents an accurate parent child relationship between the network device and the subsection of the telecommunication network.

18. A non-transitory computer-readable recording medium having recorded thereon instructions executable by at least one processor to perform a method for managing network devices in a telecommunication network using a graph data schema, the method comprising:
creating an entity model specification file;
validating a syntax of the entity model specification file based on parsing the entity model specification file;
based on the syntax being valid, validating the entity model specification file, wherein validating the entity model specification file comprises converting the entity model specification file into the graph data schema; and
initiating the graph data schema associated with the entity model specification file, wherein the initiating comprises changing the graph data schema to a ready state.

19. The non-transitory computer-readable recording medium according to claim 18, wherein the entity model specification file includes a name, a network device type, a version, one or more operator specific characteristics, and one or more relationships.

20. The non-transitory computer-readable recording medium according to claim 19, wherein the validating the entity model specification file comprises:
determining whether a base model associated with the entity model specification file is supported;
validating the version in the entity model specification file;
determining whether the name and each of the one or more operator specific characteristics are unique; and based on determining that the name and each of the one or more operator specific characteristics are unique, validating the one or more relationships.

* * * * *